Oct. 6, 1925.
N. PHILLIPS ET AL
TIRE ALARM
Filed Oct. 4, 1924
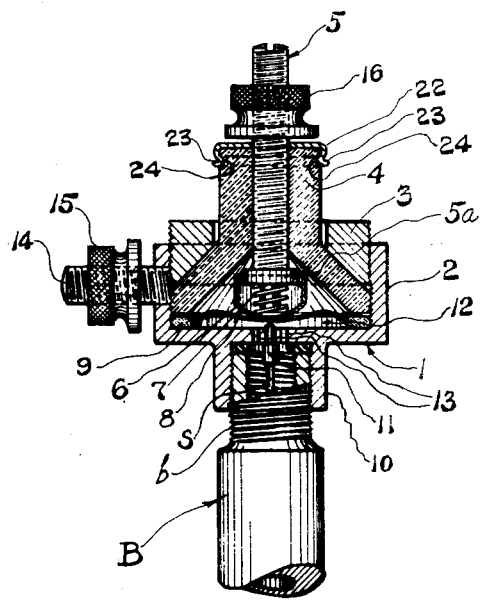
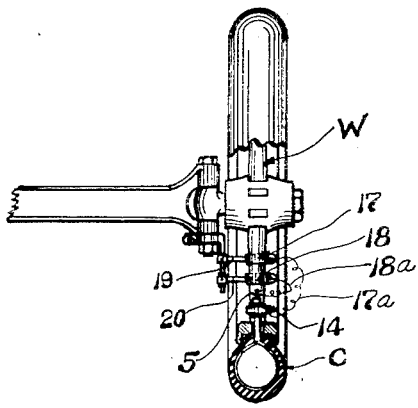
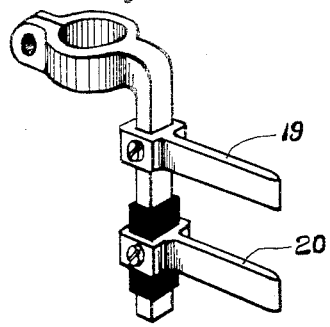
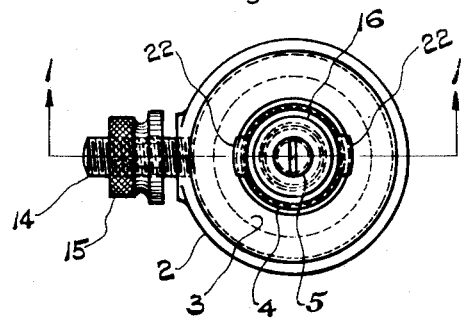
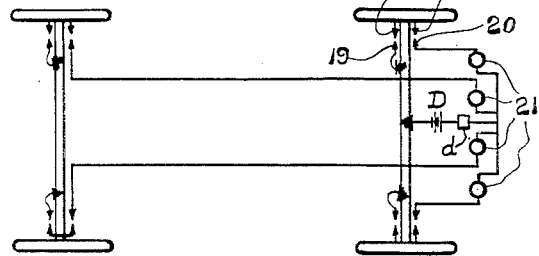
Norman Phillips & Archibald J. Martin.
INVENTOR
BY Victor J. Evans
ATTORNEY Patented Oct. 6, 1925.

1,556,542

UNITED STATES PATENT OFFICE.

NORMAN PHILLIPS AND ARCHIBALD J. MARTIN, OF SALEM, OHIO.

TIRE ALARM.

Application filed October 4, 1924. Serial No. 741,675.

*To all whom it may concern:*

Be it known that we, NORMAN PHILLIPS and ARCHIBALD J. MARTIN, both citizens of the United States, residing at Salem, in the county of Columbiana and State of Ohio, have invented new and useful Improvements in Tire Alarms, of which the following is a specification.

This invention relates to signaling means, and more particularly to what we term a tire alarm.

One of the main objects of the invention is to provide an alarm device for indicating low air pressure in pneumatic tires used for automobiles, which device can be readily produced and applied at small cost. A further object is to provide a device of this character which can be readily applied to an inflating valve tube of standard construction without necessitating any changes whatever in the construction of the tube or the valve. Another object is to provide a device of this character consisting of but few parts and which may be readily produced and sold at small cost. Further objects will appear from the detail description.

In the drawings:—

Figure 1 is a section taken substantially on line 1—1 of Fig. 2;

Figure 2 is a top plan view of the device;

Figure 3 is an elevation of the device as applied, the tire and wheel being shown partly in section;

Figure 4 is a detail of the supporting bracket and the contact fingers mounted thereon;

Figure 5 is a diagram of the circuits for the respective wheels of an automobile, the circuit of the lower left hand wheel, as considered in this figure, being closed.

The device includes a head 1 provided with an upwardly extending annular flange 2 which is interiorly threaded to receive a securing ring 3 which fits upon a body 4 of electrical insulating material. A pin 5 is threaded through body 4 and a hollow pressure member 6 is mounted about the enlarged inner end 5ᵃ of pin 5, member 6 being urged away from the pin by expansion spring 7 confined between inner end portion 5ᵃ of the pin and member 6. Pressure member 6 bears upon a flexible diaphragm 8 which is secured between body 4 and a ring 9 mounted in head 1, this ring being of electrical insulating material and diaphragm 8 being of electrical conducting material and having its edge spaced away from flange 2. Member 6, spring 7 and pin 5 are also of electrical conducting material.

Head 1 is provided with a depending neck 10 which is interiorly threaded to screw upon the upper threaded portion *b* of the inflating valve tube B of a pneumatic tire C. The valve employed is of a well known type and includes a stem *s* which extends into portion *b* of tube B and which when depressed or moved inwardly of the inflating valve tube B serves to unseat or open the valve. This construction is well known in this art and need not be further described in detail. A headed stud 11 is secured in head 1 and extends downwardly therefrom, this stud being positioned to contact with the upper end of stem *s* when the device is in operative position so as to depress the stem and open the valve permitting air to flow through the inflating valve tube into space 12 between head 1 and diaphragm 8, the head being provided with suitable openings 13 for this purpose. The body 4 and ring or gasket 9 coact with securing ring 3 to securely clamp diaphragm 8 in position and provide an air tight closure about the same, in addition to providing a mounting for this diaphragm whereby it is electrically insulated from head 1 and flange 2 in the manner previously described. A threaded stud 14 is secured in flange 2 which is of electrical conducting material, it being understood that head 1 and stud 11 are also of electrical conducting material. A thumb nut 15 is screwed onto stud 14, a similar nut 16 being screwed onto pin 5.

In using the device it is applied to inflating valve stem B in the manner illustrated so as to admit air from the tire into space 12. The pressure of this air serves to force diaphragm 8 outwardly away from head 1 so that, under normal conditions, the diaphragm is spaced away from the head and is electrically insulated therefrom. In the event that the pressure in the tire falls below a predetermined point, diaphragm 8 is forced inwardly by spring 7 into contact with body 1 thus establishing electrical connections between pin 5 and stud 14.

Two contact fingers 17 and 18 are mounted on wheel W on which the tire is mounted and are connected by wires 17ᵃ and 18ᵃ, respectively, to stud 14 and pin 5, respectively, these wires being secured to the pins by the thumb nuts. Fingers 17 and 18 are positioned to contact with contact members or strips 19 and 20, respectively, which are mounted on the structure of the automobile adjacent to the respective wheels, strips 19 being grounded to the automobile structure, and strips 20 being electrically insulated from the automobile structure. Four visual signals, such as small lights 21, are mounted on the instrument board of the automobile and are connected to one side of an electric battery D the other side of which is grounded to the automobile structure. The other side of these lights is connected to the strips 20 in such manner that, when the circuit between stud 14 and pin 5 is closed and the contact fingers 17 and 18 contact with strips 19 and 20, the light corresponding to the wheel carrying the device in which the circuit between stud 14 and pin 5 is closed, will be illuminated. During rotation of the wheel the light will be intermittently illuminated so as to produce flashes which will quickly attract the driver's attention. In addition to the lights I also preferably provide an audible signal, such as a buzzer $d$ which is connected into the light circuit in such manner as to be operated when the circuit of any one of the lights is closed. This buzzer serves to apprise the driver of the fact that one of the light circuits is closed and by watching the lights the driver can readily determine which tire or tires require attention. By adjusting pin 5 through body 4 the effective strength of spring 7 may be varied thus varying the inward pressure exerted on diaphragm 8. This provides simple and efficient means whereby the device can be readily adjusted to suit the pressure of the particular type of tire in connection with which it is used. The pin 5, after being adjusted, is secured in position by a lock member 22 provided with an opening which accommodates the pin, this member, when in operative position, engaging into the threads of the pin in such manner as to lock it against rotation. The member 22 is secured in position by resilient terminal elements 23 which engage into corresponding recesses 24 formed in the body 4 adjacent the upper end thereof. This provides very simple and efficient means for securing the pin in adjustment, though any other suitable or preferred means may be employed for this purpose.

What we claim is:—

1. In a device of the character described, a cap adapted to be removably secured on a tire inflating valve tube of a pneumatic tire, a head carried by the cap, said cap and head being of electrical conducting material and communicating with each other, a diaphragm of electrical conducting material mounted in the head beyond the cap, means for effecting a fluid tight closure about the diaphragm and for securing it in the head and electrically insulating it therefrom, and means for urging the diaphragm toward the cap and for connecting it to an electric conductor.

2. In a device of the character described, a cap adapted to be removably secured on a tire inflating valve tube of a pneumatic tire, a head carried by the cap, said cap and head being of electrical conducting material and communicating with each other, a diaphragm of electrical conducting material mounted in the head beyond the cap, means for effecting a fluid tight closure about the diaphragm and for securing it in the head and electrically insulating it therefrom, and adjustable means for urging the diaphragm toward the cap and for connecting it to an electric conductor.

3. In a device of the character described, a cap adapted to be removably secured on a tire inflating valve tube of a pneumatic tire, a head carried by the cap, said cap and head being of electrical conducting material and communicating with each other, an electrical insulating member mounted in the head adjacent the cap, a diaphragm of electrical conducting material extending transversely of the head and seated on said member, the periphery of the diaphragm being spaced away from the surrounding wall of the head, a body of electrical insulating material secured in the head and cooperating with said member to secure the diaphragm in position and form a fluid tight closure about the same, a pin of electrical conducting material secured through the body, and means coacting with the pin for urging the diaphragm toward the cap.

4. In a device of the character described, a cap adapted to be removably secured on a tire inflating valve tube of a pneumatic tire, a head carried by the cap, said cap and head being of electrical conducting material and communicating with each other, an electrical insulating member mounted in the head adjacent the cap, a diaphragm of electrical conducting material extending transversely of the head and seated on said member, the periphery of the diaphragm being spaced away from the surrounding wall of the head, a body of electrical insulating material secured in the head and cooperating with said member to secure the diaphragm in position and form a fluid tight closure about the same, a pin of electrical conducting material secured through the body, a pressure member of electrical conducting material bearing on the diaphragm and slidably mounted on the inner end of the pin, and an expansion spring within said member and confined between the same and the pin.

5. In a device of the character described, a cap adapted to be removably secured on a tire inflating valve tube of a pneumatic tire.

a head carried by the cap, said cap and head being of electrical conducting material and communicating with each other, an electrical insulating member mounted in the head adjacent the cap, a diaphragm of electrical conducting material extending transversely of the head and seated on said member, the periphery of the diaphragm being spaced away from the surrounding wall of the head, a body of electrical insulating material secured in the head and cooperating with said member to secure the diaphragm in position and form a fluid tight closure about the same, a pin of electrical conducting material secured through the body, a pressure member of electrical conducting material bearing on the diaphragm and slidably mounted on the inner end of the pin, and an expansion spring within said member and confined between the same and the pin, said pin being adjustable toward and away from the diaphragm to vary the effective expansive force of said spring.

6. In a device of the character described, a cap adapted to be removably secured on a tire inflating valve tube of a pneumatic tire, a head carried by the cap, said cap and head being of electrical conducting material and communicating with each other, an electrical insulating member mounted in the head adjacent the cap, a diaphragm of electrical conducting material extending transversely of the head and seated on said member, the periphery of the diaphragm being spaced away from the surrounding wall of the head, a body of electrical insulating material secured in the head and cooperating with said member to secure the diaphragm in position and form a fluid tight closure about the same, a pin of electrical conducting material threaded through the body, a pressure member of electrical conducting material bearing on the diaphragm and slidably mounted on the inner end of the pin, and an expansion spring within said member and confined between the same and the pin, said pin being adjustable toward and away from the diaphragm to vary the effective expansive force of said spring.

7. In a device of the character described, a cap of electrical conducting material adapted to be secured on a valve tube, a body of electrical conducting material carried by the cap, a diaphragm of electrical conducting material secured in the body transversely thereof and electrically insulated from said body, a contact element carried by the cap and disposed to contact with the diaphragm when it is moved into its extreme position toward said contact element, means for urging the diaphragm toward the contact element and for connecting it to an electrical conductor, said means being electrically insulated from the body, and means for connecting the body to an electrical conductor.

In testimony whereof we affix our signatures.

NORMAN PHILLIPS.
ARCHIBALD J. MARTIN.